United States Patent
Nippes

(10) Patent No.: US 9,273,801 B1
(45) Date of Patent: Mar. 1, 2016

(54) METHOD OF IN-SITU PIPELINE REPLACEMENT

(71) Applicant: Joseph Timothy Nippes, Homer City, PA (US)

(72) Inventor: Joseph Timothy Nippes, Homer City, PA (US)

( * ) Notice: Subject to any disclaimer, the term of this patent is extended or adjusted under 35 U.S.C. 154(b) by 194 days.

(21) Appl. No.: 14/135,688

(22) Filed: Dec. 20, 2013

Related U.S. Application Data

(60) Provisional application No. 61/748,162, filed on Jan. 2, 2013.

(51) Int. Cl.
*F16L 41/00* (2006.01)
*F16L 1/032* (2006.01)

(52) U.S. Cl.
CPC ..................... *F16L 1/032* (2013.01)

(58) Field of Classification Search
CPC ........... F16L 41/00; F16L 55/00; F16L 55/07; B29C 66/5521
USPC ..................................... 405/184.1
See application file for complete search history.

(56) References Cited

U.S. PATENT DOCUMENTS

| | | |
|---|---|---|
| 4,863,365 A | 9/1989 | Ledoux |
| 4,985,196 A | 1/1991 | Ledoux |
| 4,986,951 A | 1/1991 | Ledoux |
| 4,998,871 A | 3/1991 | Ledoux |
| 5,091,137 A | 2/1992 | Ledoux |
| 5,112,211 A | 5/1992 | Ledoux |
| 5,342,570 A | 8/1994 | Ledoux |
| 7,241,084 B2 * | 7/2007 | Hutton et al. .................. 408/124 |
| 7,674,072 B2 * | 3/2010 | Shook et al. .................. 405/156 |
| 8,082,823 B2 * | 12/2011 | Kravitch ........................ 82/1.11 |
| 8,172,482 B2 * | 5/2012 | Kiest, Jr. .................... 405/184.1 |

OTHER PUBLICATIONS

Rinker Materials Pipeline Systems, U-Liner pipe brochure, US.

* cited by examiner

*Primary Examiner* — Tara M. Pinnock
(74) *Attorney, Agent, or Firm* — Andrew D. Mead; Brant A. Hershey

(57) ABSTRACT

A method of in-situ pipeline replacement in which valves, fittings, and other obstructions are removed from an existing pipeline, a heat-fusible polymer pipeline having an initially deformed configuration less than the existing pipeline diameter is inserted into the remaining portions of the existing pipeline and reformed to substantially conform to the inside diameter of the existing pipeline, heat-fusible fittings are provided to replace removed portions of the existing pipeline and heat-fused to the polymer liner, and transition fittings provided to operably connect the replacement pipeline to those portions of the existing pipeline not within the replacement scope. The completed replacement polymer pipeline creates an operable wetted pressure boundary within the bounds of the replaced existing pipeline.

10 Claims, 1 Drawing Sheet

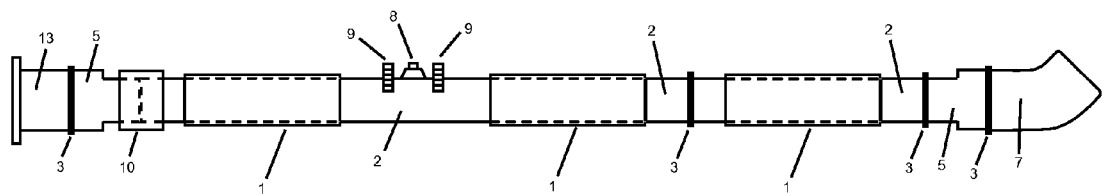

METHOD OF IN-SITU PIPELINE REPLACEMENT

CROSS-REFERENCE TO RELATED APPLICATIONS

This application claims the benefit of provisional patent application Ser. No. 61/748,162 filed 2013 Jan. 2 by the present inventor.

STATEMENT REGARDING FEDERALLY SPONSORED RESEARCH OR DEVELOPMENT

Not Applicable

REFERENCE TO SEQUENCE LISTING, A TABLE, OR A COMPUTER PROGRAM LISTING COMPACT DISK APPENDIX

Not Applicable

BACKGROUND OF THE INVENTION

1. Field of the Invention

The present invention is in the technical field of heavy construction related to the installation, repair, and replacement of pipelines. Particularly, the present invention is in the technical field of in-situ replacement methods of existing pressure pipelines such as, but not limited to, drinking water, natural gas, and sewerage. "In situ" is a Latin phrase meaning "in position," and in this case means the old pipeline is replaced without complete removal or excavation.

2. Description of the Prior Art

Many cast iron pipelines supplying our drinking water and natural gas and carrying away our sewerage are aging, corroding, and generally wearing out. In urban areas where space is tight and buried infrastructure is very dense, buried pipelines are particularly expensive to replace. The general approach in many areas is "run to failure" where leaks and other sometimes-catastrophic failures are repaired only after they occur. A systematic, proactive, and cost effective approach to replace our aging underground pipeline infrastructure is needed. In-situ pipe replacement using a polymer pipe is an economical and proactive solution to replacing old pressurized water, gas, and sewer pipes.

Pipelines fall into two basic groups: gravity flow and pressurized. To extend the useful life of gravity flow pipelines, such as sanitary sewers, rehabilitation techniques have been developed over the past forty-plus years. These techniques save time and money by utilizing a liner to reduce ground water infiltration and thus the treatment demand on sewer plants. The rehabilitation of gravity pipelines is a fairly simple process. A felt tube (or "sock") is impregnated with a thermo-set resin at a manufacturing facility and stored in a refrigerated facility. The impregnated tube is then transported in refrigerated trailers to a project site where it is installed by water or air inversion (like turning a sock inside out) and then the resin is cured using hot water, steam, or ultra violet light. The result of this process is a rigid, non-structural tube that becomes a liner.

The above process is referred to as CIPP (cured in place pipe) and was invented by Insituform in 1971 and is still widely used today. Because gravity flow pipelines follow a constant grade and alignment and have manholes at regular intervals, installation of CIPP is accomplished without excavation ("no-dig") by inverting the liner in and between manholes. The primary purpose of this type of rehabilitation in gravity sewers is to prevent ground water from entering the pipeline through the joints and broken pipe, thus preventing it from being conveyed to the treatment plant for processing along with raw sewerage. Treatment plants are the most expensive part of the sanitary sewer disposal process and reducing ground water infiltration saves capacity and money.

The rehabilitation of pressurized pipelines carrying water, sewerage, natural gas, or other materials is more complicated. Pressurized pipelines have no manholes for easy access nor do they follow a constant line and grade (the pressure causes the material to flow and not gravity). They normally follow the natural terrain of the ground in which they were installed. In addition, the pipeline path could vary based on the allowable engineering parameters for the particular piping material and construction method such as allowable deflection at joints or flexural modulus. Finally, pressure pipes have appurtenances attached to them like valves, tees, wyes, elbows, bends, and others which further complicate rehabilitation and replacement.

Over time, the interior of older cast iron water pipes not lined with cement mortar or epoxy become encrusted with various deposits known as tuberculation. It is important to remove tuberculation when it builds up enough to impact both water quality for drinking and water volume for fire fighting. Additionally, soil surrounding an exterior pipe wall may have a chemical composition which causes corrosion, further deteriorating the pipe.

To deal with tuberculation in old cast iron pipes, a process called cement mortar lining was developed to line the interior of water pipelines in-situ. The lines are cleaned and a thin layer of cement mortar is installed using robotic equipment that moves through the pipeline. This process does not add any structural strength to the existing pipe; it only improves water quality and flow. The preparation of pipes for the cement mortar lining process is the current foundation for in-situ pipeline replacement and for pipeline rehabilitation.

The current methods for replacing or rehabilitating water and other pressure lines include: 1) Digging and replacing the existing pipe in the same trench, 2) Installing a new pipe by digging a parallel trench and abandoning the old line once the new line is put into service, 3) Pipe bursting, which is the process of bursting the existing pipe and simultaneously pulling in a new pipe, 4) Traditional slip lining, which is inserting a smaller diameter pipe into the existing pipe, or 5) Installing a structural CIPP (cured in place pipe) liner.

Pipe bursting is well established but expensive as is any version of digging and replacing. Slip lining is simple and straight forward but usually reduces capacity to an unacceptable level because of the reduced diameter of the new pipe. CIPP for water or other pressure lines is expensive, appurtenances are difficult to attach, it may need to rely on the existing pipeline for structural integrity, and it requires a long lead time to install properly.

A viable solution for overcoming these problems is to replace the entire piping system with an in-situ replacement pipeline. This in-situ pipeline utilizes a deformed polymer pipe, such as high density polyethylene (HDPE), and can employ up to 100% of the old pipe's interior, thus having little impact on water flow or volume.

For comparison purposes, to clean and install a cement mortar lining in old water piping requires these steps:
1. Install and test a temporary surface pipeline (by-pass) to serve water users. This by-pass is temperature sensitive and in northern climates, the season is operational from about mid-March to mid-November. The old buried line is then taken out of service and dewatered. Sections of pipe containing valves, tees, bends above about 22.5 degrees, and other obstructions are removed by excavation. The line is then cleaned using mechanical scrapers.

2. Spray cement mortar onto the pipe walls using remote controlled spinning nozzles.

3. Open any cement mortar covered service connections by blowing air back through the service connection line from the meter vault to the main. If the service lines are galvanized steel or other deteriorated material, they are usually replaced.

4. Install new valves, tees and bends to the existing pipe.

5. Fill and chlorinate the line and test for pressure loss and pathogens.

6. Return the line to service, backfill excavations, restore surface features (roadway, sidewalk, grass, etc.) and remove the temporary by-pass.

For further comparison purposes, to clean and install CIPP lining in old water piping requires these steps:

1. Remove a section of pipe by excavation to determine the inside dimension and measure the length to be installed. Order a liner from the factory manufactured to the specified interior dimension and length. If the liner is too large in diameter, it will create a fold which will weaken the liner. If it is too long, it will be difficult to install. If it is too small in diameter, it may be weakened by not being in contact with the cast iron pipe walls. If it is too short, it will be unusable because it would be impossible to finish the ends.

2. Install a by-pass line as described above. In some instances, certain bends may not require removal depending on their degree and radius.

3. Wet out and transport the liner to the site and install using air or water inversion. To reopen the service connections, cut and remove the liner covering the service connection with remote control cutters.

4. Seal the liner to the existing pipeline to prevent water from getting between the cast iron pipe and the liner.

5. Install new valves, tees and bends to the old cast iron pipe, backfill, and restore.

6. Fill, chlorinate and test.

7. Return the line to service.

Per the method of this invention, to clean and install an in-situ new pipe in old water piping requires these steps:

1. Install by-pass as described above. Remove valves, tees, bends above about 11 degrees (or another angle as specified by the deformed pipe manufacturer) and all service connections.

2. Install deformed polymer pipe and expand it (reform it to round shape), utilizing up to 100% of the existing pipe's interior diameter.

3. Attach by butt or electro fusing new valves, tees, bends and service connections to the new pipe. Most of these fittings are inexpensive, off-the-shelf, easy to install, and do not rely on the old existing pipeline for reconnection or structural support.

4. Fill, chlorinate and test.

5. Return line to service.

Millions of feet of cement mortar lining have been installed over the past twenty years; the process is well known, understood and accepted. The major expense of this process comes before and after the application of the cement mortar. Installing a new in-situ pipe inside the existing pipe in lieu of cement mortar lining is a natural evolution in the water pipe replacement process.

The advantages of using the in-situ pipe replacement method of this invention over other methods are:

1. The finished product is a new stand-alone pipe with no reliance on the existing pipe to achieve an acceptable pressure rating or to attach appurtenances. The old pipe is only effectively used as a sleeve that holds back the earth and creates a space for the new pipe during installation.

2. Polymer materials like HDPE are widely accepted for a variety of pipeline types and uses.

3. Fittings are readily available, inexpensive, and easily heat fused to the new polymer pipe and not installed onto the old pipe.

4. The variation in old pipe diameters is overcome by the number of polymer pipe sizes that are available.

5. This method creates a new pipeline system with, in most cases, a greater capacity than the pipe it is replacing. This is due to the smoothness of the polymer pipe interior which creates less fiction and lowers pressure loss over distance.

6. Cost savings of around one third (33 percent) or greater over other methods.

By deforming the polymer pipe immediately after it is manufactured it can then more easily be inserted into the old pipe and can occupy up to 100% of the old pipe's interior. Making deformed polymer piping is established technology (see Dura-Line Corporation for example) and generally the pipe is factory formed in a u-shape about one half its final expanded diameter. The pipe is then re-rounded in-situ per established methods like heat and pressure. This is important because the deformed size makes installation easier and the expanded size makes obtaining flow easier.

Standard round HDPE pipe comes in three standard sizes: IPS, short for cast iron pipe size; DIPS, or ductile iron pipe size; or metric (imported). Fittings are made to accommodate these standard sizes. In addition to size, HDPE is rated for pressure defined as SDR (often shortened to DR), standard dimension ratio. SDR is the ratio of pipe diameter to wall thickness and the lower the value, the higher the pressure the pipe will withstand. The higher the pressure rating, the thicker the pipe wall is thus reducing the interior diameter. Manning n value is the value by which flow can be compared within various types of pipe walls. For example, the interior wall of smaller HDPE can allow greater flow than the interior wall of a larger unlined cast iron pipe.

Installation of a new deformed pipe is procedurally similar to slip lining (inserting a round, not deformed new pipe into an old pipe) but offers the significant advantage of a larger diameter new pipe with its associated higher flow rate and volume. As an example, to slip line an eight-inch cast iron pipe, the best fit would be a ductile iron pipe size six-inch HDPE pipe (Standard Dimension Ratio of 17) with an outside dimension of 6.9" and interior dimension of 6.04". Even with the reduced Manning n value of the HDPE material, the result is a significantly lower flow because of the smaller diameter of the new pipe. The deformed and reformed in-situ process with the same pressure rating of 125 psi would be an eight-inch outside dimension with a 7.04-inch interior dimension. It should be noted the difficulty factor of using a 6-inch HDPE pipe to slip line eight inch cast iron pipe is extremely high and would seldom, if ever, be attempted in real field conditions. This example was given for illustration purposes; in reality, the best a contractor could expect to install is a six-inch iron pipe size pipe with an interior dimension of 4.9 inches Although flexible liners can achieve the same volume and flow, new fittings must be attached to the old pipe and not to the flexible liner. Also, the flexible liner in some cases must rely on the existing pipeline for structural integrity. The in-situ method of this invention creates a new pipeline that does not rely on the old pipe in any way after the new installation. The new pipe is structurally independent and all fittings are attached only to the new pipe. Special transition pieces are used where the new pipe exits from the old to allow the use of standard fittings such as valves, bends, tees, etc.

SUMMARY OF THE INVENTION

The present invention is a method of in situ pipeline replacement. The method of this invention creates an entirely new pipeline system utilizing up to 100% of the existing pipe's interior space and all replacement fittings are connected to the new pipe and not the old. The new pipeline is created within the foot print of the existing pipeline and is not simply a lining process. The method is directed primarily toward pressurized underground pipeline replacement such as drinking water, process or fracking water, brine, natural gas, and pressure sewers but can be used for pipelines in any location, pressure, or flow material compatible with polymer piping.

The method comprises these steps:
1. Install a temporary by-pass for existing pipeline per standard and accepted techniques.
2. Inspect pipeline and drawings or plans to determine the location of fittings, valves, tees, bends above about 11 degrees (or another angle as specified by the deformed pipe manufacturer), service connections, and other appurtenances.
3. Excavate or otherwise gain access to appurtenances described above and remove them. Removal will generally involve using standard techniques for cutting a section of pipeline out and discarding it along with the appurtenance. Attached service lines, like an individual water line to a home, are removed, disconnected, or cut depending on site conditions and economics. Excavation for underground pipelines will also allow access points to install the new deformed pipe.
4. Take measurements for the new deformed pipe, including desired expanded diameter and length needed. The expanded diameter will generally be equal to or very slightly less than the inside diameter of the old pipe. The deformed pipe is manufactured using standard and established techniques. See, for example, U.S. Pat. Nos. 5,342,570, 5,112,211, 5,091,137, 4,998,871, 4,986,951, 4,985,196, and 4,863,365. No claim is made to the manufacturing of the deformed pipe. The material of the deformed pipe is a polymer, generally high density polyethylene (HDPE).
5. The deformed polymer pipe is installed into the old pipe and expanded (reformed), utilizing up to 100% of the existing pipe's interior diameter. Installation and expansion are performed using standard, established methods. See the U.S. patents referenced directly above. In longer straight runs, sections of deformed pipe are butt fused together on-site prior to or during installation into the old pipe. Butt fusion of PE pipe is a well-established heat fusion technique that uses externally applied heat and pressure to form a joint that is as strong as the pipe itself. Where appurtenances were removed from the old pipe and a break in the old pipe exists, the new pipe will either pass through the break or stop after the break. For example, the new pipe will pass through the break of a service connection but stop after a bend area.
6. All appurtenances are now replaced using standard fittings and custom transitions or adapters. Standard new valves, tees, bends, service connections, restraints, and other fittings are inexpensive, off-the-shelf, easy to install, and do not rely on the old pipe for reconnection. They attach by butt or electro heat fusion using standard techniques. Electro fusion uses a heating element built into the fitting to create the joint. Either butt or electro fusion may generally be used depending on access and cost considerations. Electro fusion is generally used for service connections and restraints. Electro fusion is more expensive but works in tight spots and for connections to the curved outside of the new pipe.

Transition or adapters are used to go from the new pipe to standard fittings that are widely available and produced at low cost from existing molds. They are needed because the new pipe will generally have a non-standard diameter. Transitions or adapters will generally be made of the same material as the new pipe, can work with either butt or electro fusion, and will generally have one side sized to match diameter and wall thickness of the new pipe and the other side sized to match diameter and wall thickness of a standard fitting. Transitions or adapters can be made using standard machining or molding techniques.

Service connections (tapping tees, "saddles," etc) are electro fused to the new pipe. They are standard items that are sized for an approximate outer diameter and provide a connection (threaded or fusion) for the smaller service line. They are installed by clamping so as to be in contact with the outer surface of the new pipe and electro fusing them in place. Clamping is required because the new pipe diameter will generally not be standard. A clamping tool with threads much like common C-clamp can be made or purchased. After the service connection is installed, a hole is cut or pierced into the pipeline to allow service flow of water, gas, or other material. Cuttings are recovered to prevent contamination. The existing service line is then connected to the service connection.

Restraints are installed as needed on each side of the service connection by electro fusion and clamping. Restraints are connected to the new pipe to limit its movement. Restraints are rigidly connected to each other and thus limit movement of the pipe in the area of the service connection. This reduces the effects of thermal expansion and contraction of the pipe on the service connection.
7. The new pipe is tested, filled, disinfected, or otherwise prepared for service. It can then be connected into other existing piping, if applicable, and is then ready for use.

BRIEF DESCRIPTION OF THE DRAWING

A side view of a typical section of pipeline created per the method of the invention.

DRAWINGS

Reference Numbers 1 existing pipeline
2 new heat-fusible polymer pipeline
3 butt fusion
5 transition fitting
7 bend or elbow
8 service connection
9 pipe restraint
10 electro fusion coupling
13 mechanical joint transition

DETAILED DESCRIPTION OF THE INVENTION

Referring now to the invention in more detail, there is shown an existing pipeline 1 and it is the pipeline to be replaced. Existing pipeline 1 is only used as a void in which to install new heat-fusible polymer pipeline 2 and is in no way relied upon by the new pipeline created per the method of this invention. New heat-fusible polymer pipeline 2 is installed inside existing pipeline 1. New heat-fusible polymer pipeline 2 is installed in a deformed configuration, often u-shaped and about half its expanded diameter, and expanded in situ to use up to 100 percent of the interior diameter of existing pipeline 1. Sections of new heat-fusible polymer pipeline 2 are joined to each other as needed with butt fusion 3. Joining of sections of new heat-fusible polymer pipeline 2 could be done prior to installation into existing pipeline 1 or after installation or after both installation and expansion. Butt fusion after installation requires a small break in existing pipeline 1 in which to work. In the alternative to butt fusion 3, sections of new heat-fusible polymer pipeline 2 are joined with electro fusion coupling 10. Electro fusion couplings are more expensive than butt fusion but can be used in very limited working spaces.

Where valves, tees, bends, or other fittings are required, transition fitting 5 is attached to new heat-fusible polymer pipeline 2 with butt fusion 3. Alternatively, transition fitting 5 is attached to new heat-fusible polymer pipeline 2 with electro fusion coupling 10. Transition fitting 5 is generally custom made to match the custom size (inner and outer diameter) of new heat-fusible polymer pipeline 2. Thus half of transition fitting 5 is custom sized and the other half has a standard size to work with readily available and low-cost standard fittings. The standard size half of transition fitting 5 is attached to bend or elbow 7 or mechanical joint transition 13 with butt fusion 3. Alternatively, an electro fusion coupling could be used here. Although only an elbow and mechanical joint transition are shown, any standard fitting can be attached to transition fitting 5.

Service connection 8 is electro fused to new heat-fusible polymer pipeline 2. Service connection 8 is a standard item (not custom sized) that fits around part of the outside of a pipe (like a saddle) and provides pipe threads, a fusion fitting, or another method of attachment for a smaller service line, such as a water line going into a house from the street. Service connection 8 is clamped onto new heat-fusible polymer pipeline 2 to ensure tight contact and good fusion even if new heat-fusible polymer pipeline 2 even if service connection 8 does not exactly match the size of new heat-fusible polymer pipeline 2. A custom clamp can easily be made that uses threads to apply the clamping force. After installation of service connection 8, a hole is cut into new heat-fusible polymer pipeline 2 to allow service flow. Cuttings are collected to prevent them from entering the inside of new heat-fusible polymer pipeline 2.

Pipe restraint 9 is installed by electro fusion onto new heat-fusible polymer pipeline 2 on each side of service connection 8. Pipe restraint 9 is a standard item (not custom sized) that often fits around part of the outside of a pipe and provides an attachment point for ridged rods. Clamping is performed in the same way as with service connection 8. Pipe restraints 9 on each side of service connection 8 are then connected together with two or more ridged rods or similar standard apparatus (not shown). This limits the movement (expansion and contraction due to temperature changes) of the pipe in area of service connection 8 thus preventing breakage or leaks in the service line (not shown) attached to service connection 8.

In more detail, new heat-fusible polymer pipeline 2 can be made of any polymer than can be deformed and heat fused. New heat-fusible polymer pipeline 2 will be typically high density polyethylene (HDPE). Standard Dimension Ratios for new heat-fusible polymer pipeline are typically, but not limited to, 40 to 13.5. Transition fitting 5 will generally be made from a polymer that can be heat fused to new heat-fusible polymer pipeline 2, and it is preferred to be the same polymer used to make new heat-fusible polymer pipeline 2. Bend or elbow 7, mechanical joint transition 13, or other fittings will generally be made from a polymer that can be heat fused to transition fitting 5, and it is preferred to be the same polymer used to make new heat-fusible polymer pipeline 2. Butt fusion 10 will generally be made from a polymer that can be heat fused to transition fitting 5 and new heat-fusible polymer pipeline 2, and it is preferred to be the same polymer used to make new heat-fusible polymer pipeline 2. Service connection 8 and pipe restraint 9 will generally be made from a polymer that can be heat fused to new heat-fusible polymer pipeline 2, and it is preferred to be the same polymer used to make new heat-fusible polymer pipeline 2.

ADVANTAGES

The method of in-situ pressure pipeline replacement described above has numerous advantages:

(a) It utilizes up to 100 percent of the old pipeline's interior.

(b) The new pipeline is completely independent of the old pipeline.

(c) All pipe fittings and appurtenances are attached to the new pipeline and do not rely on the old pipe in any way.

(d) Most pipe fittings and appurtenances are standard, off-the-shelf items.

(e) A new, independent pressure pipeline is produced at significantly lower cost than any other method.

(f) The equipment needed to practice the method of the invention is readily available to most experienced pipeline contractors.

(g) Significant cost saving over other established methods of pipeline replacement.

Installed pipelines vary greatly depending on complex factors. Exact construction details for every variation cannot possibly be described here but are within the experience of typical contractors who engage in pipeline construction activities. Standard and established methods such as excavation, rigging, cutting pipelines, making and installing deformed pipe, restraint, pipe fittings, polymer fusion, tapping lines, etc. are well known to experienced contractors and can be readily referenced in the literature.

In broad embodiment, the present invention is a method of in-situ pressure pipeline replacement that creates a new, independent pipeline in the foot print of the old line.

While the foregoing written description of the invention enables one having ordinary skill to practice what is considered presently to be the best mode thereof, those having ordinary skill will understand and appreciate the existence of variations, combinations, and equivalents of the specific embodiment, method, and examples herein. The invention should therefore not be limited by the above described embodiment, method, and examples, but by all embodiments and methods within the scope and spirit of the invention. Thus, the scope of the embodiment should be determined by the appended claims and their legal equivalents, rather than by the examples given.

I claim:

1. A method of in-situ pipeline replacement which comprises:
    locating fittings, valves, tees, bends above the flexibility limit of a replacement heat-fusible polymer pipeline, service connections, and appurtenances in an existing pipeline;
    excavating or otherwise gaining access to said fittings, valves, tees, bends above the flexibility limit of said replacement heat-fusible polymer pipeline, service connections, and appurtenances in said existing pipeline;
    removing said fittings, valves, tees, bends above the flexibility limit of said replacement heat-fusible polymer pipeline, service connections, and appurtenances in said existing pipeline;
    installing said replacement heat-fusible polymer pipeline into said existing pipeline such that said replacement heat-fusible polymer pipeline is in a folded or otherwise deformed configuration with a cross-sectional configuration less than the internal diameter of said existing pipeline;

unfolding, reforming, or expanding said replacement heat-fusible polymer pipeline so that the outside diameter of said replacement heat-fusible polymer pipeline is equal to or nearly equal to the inside diameter of said existing pipeline;

installing polymer transition fittings by heat fusion to said replacement heat-fusible polymer pipeline at all required locations of said replacement heat-fusible polymer pipeline such that one side of said transition fitting is custom sized to match the diameter of said heat-fusible polymer pipeline and the other side is sized to match an industry-standard pipe size;

installing polymer industry-standard pipe size fittings by heat-fusion to said polymer transition fittings at all locations so as to create a continuous new pipeline structure;

installing required additional pipe fittings, appurtenances, service connections, and pipe restraints by heat fusion to the exterior surface of said replacement heat-fusible polymer pipeline; and piercing said replacement heat-fusible polymer pipeline at all locations where a pipe fitting or appurtenances are heat fused to the exterior surface of said replacement heat-fusible polymer pipeline and pipeline product flow is required.

2. The method of claim 1 wherein said new heat-fusible polymer pipeline is composed of high-density polyethylene.

3. The method of claim 2 wherein said polymer transition fittings are composed of high-density polyethylene.

4. The method of claim 1 wherein two or more section of said replacement heat-fusible polymer pipeline are heat fused together to form a longer section prior to installation into said existing pipeline.

5. The method of claim 1 wherein two or more section of said replacement heat-fusible polymer pipeline are heat fused together to form a longer section after unfolding, reforming, or expanding said replacement heat-fusible polymer pipeline.

6. The method of claim 1 wherein said service connections and pipe restraints attached by heat fusion to the exterior surface of said replacement heat-fusible polymer pipeline are secured during the heat fusion process using a clamping tool.

7. A method of in-situ pipeline replacement for an existing pipeline comprising the steps of:

providing a heat-fusible polymer replacement pipe having a flexibility limit;

identifying obstructions in the existing pipeline requiring flexibility of the replacement pipe when routed therethrough exceeding the flexibility limit;

providing heat-fusible polymer transition fittings configured to connect the replacement pipe to existing pipeline;

providing access to at least the identified obstructions in the existing pipeline;

removing the identified obstructions from the existing pipeline;

deforming the replacement pipe to a deformed cross-sectional configuration that is less than the internal diameter of the existing pipeline;

installing the replacement pipe in the deformed configuration into the existing pipeline;

reforming the replacement pipe so that the outside diameter of the replacement pipe generally conforms to the internal diameter of the existing pipeline; and connecting the replacement pipe to a non-replaced portion of the existing pipeline not subject to in-situ replacement by heat fusing the transition fittings to the replacement pipe and connecting to the non-replaced portion.

8. The method of claim 7, further comprising the steps of:

identifying, from the identified obstructions removed, pipeline appurtenances requiring replacement;

providing heat-fusible polymer replacement appurtenances;

replacing, as required, the removed pipeline appurtenances of the existing pipeline with replacement appurtenances by heat fusing the replacement appurtenances to the replacement pipe;

and piercing the replacement pipe at all locations where replacement appurtenances are heat fused to an exterior surface of the replacement pipe and flow between the replacement pipe and the respective replacement appurtenance is required.

9. The method of claim 8, wherein the replacement appurtenances may comprise fittings, tees, elbows, valves, bends, service connections, and adapters.

10. The method of claim 8, wherein the replacement appurtenances and transition fittings comprise high-density polyethylene.

* * * * *